United States Patent
Förster

(10) Patent No.: US 11,098,782 B2
(45) Date of Patent: Aug. 24, 2021

(54) DAMPING VALVE ARRANGEMENT

(71) Applicant: ZF Friedrichshafen AG, Friedrichshafen (DE)

(72) Inventor: Andreas Förster, Schweinfurt (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 96 days.

(21) Appl. No.: 16/476,935

(22) PCT Filed: Dec. 11, 2017

(86) PCT No.: PCT/EP2017/082116
§ 371 (c)(1),
(2) Date: Jul. 10, 2019

(87) PCT Pub. No.: WO2018/130352
PCT Pub. Date: Jul. 19, 2018

(65) Prior Publication Data
US 2019/0331193 A1 Oct. 31, 2019

(30) Foreign Application Priority Data

Jan. 11, 2017 (DE) ..................... 10 2017 200 375.8

(51) Int. Cl.
*F16F 9/348* (2006.01)
*F16F 9/512* (2006.01)
*F16K 15/18* (2006.01)

(52) U.S. Cl.
CPC .......... *F16F 9/3488* (2013.01); *F16F 9/5126* (2013.01); *F16F 2228/04* (2013.01);
(Continued)

(58) Field of Classification Search
CPC ...... F16F 9/3488; F16F 9/3487; F16F 9/5126; F16F 2228/04; F16F 2228/08;
(Continued)

(56) References Cited

U.S. PATENT DOCUMENTS

| 4,721,130 A | 1/1988 | Hayashi |
| 8,733,520 B2 | 5/2014 | Kim |

(Continued)

FOREIGN PATENT DOCUMENTS

| DE | 19729289 | 1/1990 |
| DE | 102010041606 | 3/2012 |

(Continued)

*Primary Examiner* — Robert A. Siconolfi
*Assistant Examiner* — San M Aung
(74) *Attorney, Agent, or Firm* — Cozen O'Connor

(57) ABSTRACT

A damping valve arrangement of a vibration damper for a motor vehicle includes a damping valve body having a longitudinal axis A and a throughflow passage is covered by at least one valve disk, a spring arrangement has at least a first substantially disk-shaped spring element; and a force transmission disk arranged between the valve disk and the first spring element so as to be axially displaceable coaxial to the damping valve body. The force transmission disk has a first surface facing the first spring element and comprising a first contact ring with a first diameter, which first contact ring is axially elevated above the first surface, and a second surface opposite the first surface, which second surface faces the valve disk and comprises a second contact ring with a second diameter, which second contact ring is axially elevated above the second surface.

8 Claims, 3 Drawing Sheets

(52) U.S. Cl.
CPC ....... *F16F 2228/08* (2013.01); *F16F 2230/18* (2013.01); *F16K 15/18* (2013.01)

(58) Field of Classification Search
CPC ...... F16F 2230/18; F16K 15/34; B60G 13/06; B60G 17/06
USPC ........ 188/280, 275, 282.9, 313, 317, 322.15
See application file for complete search history.

(56) References Cited

U.S. PATENT DOCUMENTS

| | | | |
|---|---|---|---|
| 2015/0276002 A1* | 10/2015 | Eichenmuller | ....... F16F 9/3485 188/322.15 |
| 2015/0276005 A1* | 10/2015 | Kim | ....... F16F 9/348 188/317 |
| 2018/0180134 A1 | 6/2018 | Förster | |

FOREIGN PATENT DOCUMENTS

| | | | |
|---|---|---|---|
| DE | 102011103368 | | 3/2012 |
| DE | 102013200232 | * | 5/2014 |
| DE | 102016210950 | | 11/2016 |
| DE | 102015211891 | | 12/2016 |
| DE | 102016217113 | | 12/2016 |
| EP | 228033 | | 7/1987 |

* cited by examiner

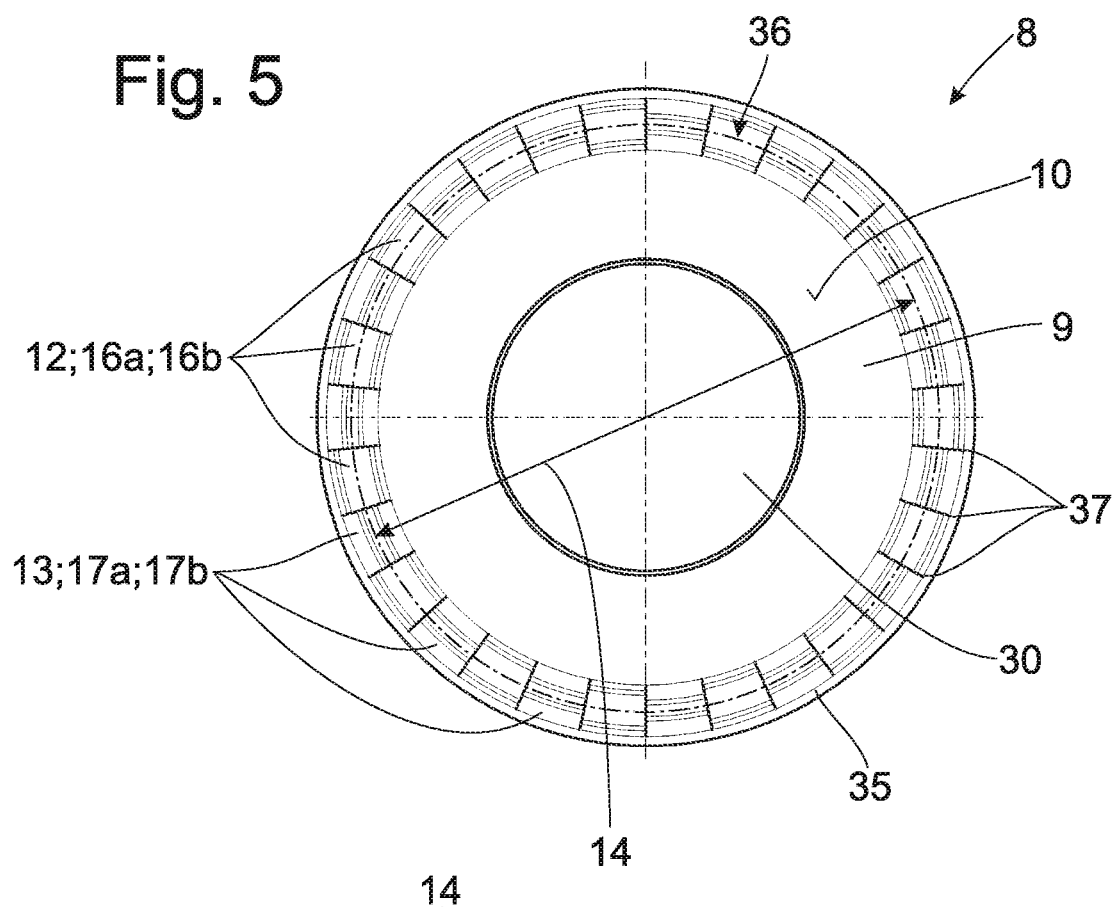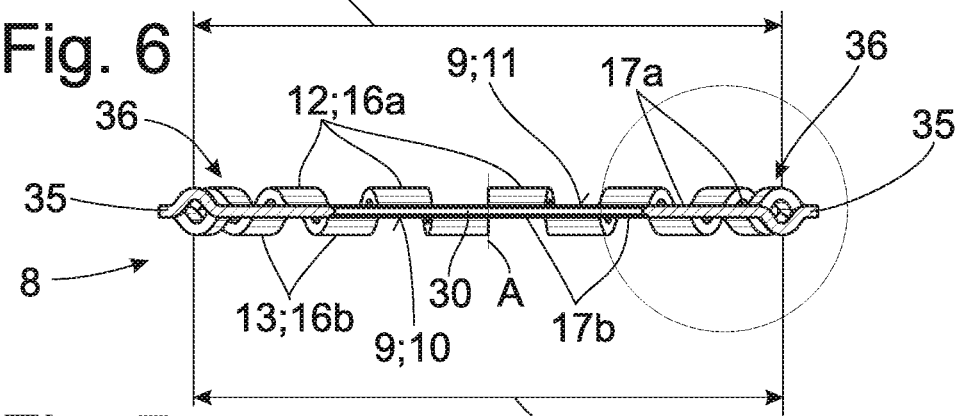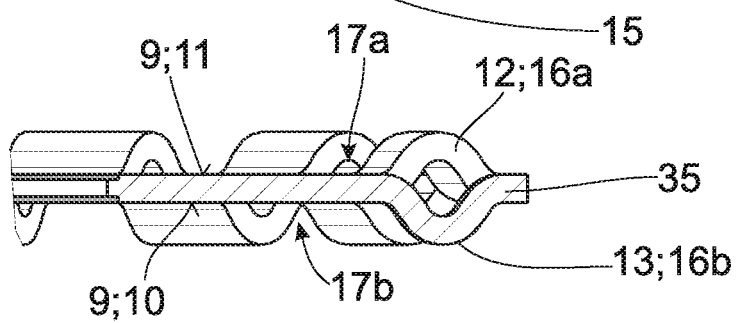

DAMPING VALVE ARRANGEMENT

PRIORITY CLAIM

This is a U.S. national stage of application No. PCT/EP2017/082116, filed on Dec. 11, 2017. Priority is claimed on the following application: Country: Germany, Application No.: 10 2017 200 375.8, filed: Jan. 11, 2017; the content of which is/are incorporated herein in its entirety by reference.

FIELD OF THE INVENTION

The invention is directed to a damping valve arrangement of a vibration damper for a motor vehicle with a damping valve body arranged inside of a cylinder which is at least partially filled with a damping fluid, a spring arrangement which has at least a first substantially disk-shaped spring element, and a transmission disk which receives a spring force from the first spring element of the spring arrangement and transmits it to the valve disk.

BACKGROUND OF THE INVENTION

Such damping valve arrangements of a vibration damper for a motor vehicle are amply known.

DE 10 2014 210 705 A1, for example, the content of which is hereby incorporated herein in its entirety, shows a damping valve arrangement which comprises a damping valve body arranged inside of a cylinder which is at least partially filled with a damping fluid. The damping valve body has a throughflow passage for the damping fluid which is covered by at least one valve disk which dampingly limits a flow of damping fluid through the throughflow passage. A spring arrangement which is axially displaceably arranged coaxial to the damping valve body has at least a first substantially disk-shaped first spring element which transmits its spring force to the valve disk.

The spring element in the damping valve arrangement shown in DE 10 2014 210 705 A1 is a springingly resilient component part which deforms reversibly under load. In this way, the shape of the support surface or contact surface between the spring element and the valve disk changes under each load. Accordingly, a precise adjustment of the damping force characteristic at this location can only be carried out with great difficulty.

Therefore, it is an object of the invention to provide an alternative damping valve arrangement which offers a possibility for a more precise adjustment of the damping force characteristic.

SUMMARY OF THE INVENTION

To meet the above-stated object, according to the invention, a force transmission disk is used, which force transmission disk is arranged between the first spring element and the valve disk and has a first surface facing the first spring element and comprising a first contact ring with a first diameter, which first contact ring is axially elevated above the first surface. The force transmission disk further comprises a second surface opposite the first surface, which second surface faces the valve disk and comprises a second contact ring with a second diameter, which second contact ring is axially elevated above the second surface.

The force transmission disk receives on its first contact ring the spring force introduced by the first spring element into the force transmission disk and conducts this spring force via the second contact ring to the valve disk. The above-described force transmission and therefore also the damping force characteristic can be defined in an appreciably more precise manner through a selection of the magnitude of the first diameter of the first contact ring and of the second diameter of the second contact ring.

In an advantageous manner, the first contact ring and the second contact ring can be formed integral with the force transmission disk. In this regard, the contact rings can be formed at the force transmission disk or formed out of the force transmission disk in a simple manner.

If the force transmission disk is to be exposed to particularly high forces, it can be produced from a metal by a cutting or noncutting production process, by a deforming process or as a sintered component part.

The force transmission disk could be produced particularly inexpensively from a sheet metal as a bent sheet metal part.

The force transmission disk can likewise be constructed from a plastic with or without fiber reinforcement, from a thermoset plastic or from a thermoplastic in order to significantly reduce the weight of the force transmission disk in an advantageous manner compared with a force transmission disk constructed from metal (see organic sheets or Organoblech LANXESS®).

According to a further advantageous constructional embodiment, it can be provided that the first contact ring and/or the second contact ring are constructed in a segmented manner and comprise at least two segments with at least two radial recesses formed between the segments. This further promotes a radially directed flow of the damping fluid.

Beyond this, it can be provided in an advantageous manner that an axial extension of the first contact ring axially defines a chamber which is arranged between the first spring element and the first surface of the center portion of the force transmission disk. This chamber affords a simple possibility for limiting the maximum deflection height of the first spring element and, accordingly, additionally influencing the damping force characteristic.

Beyond this, according to a further advantageous constructional embodiment, the force transmission disk can have at least one throughflow channel in order to facilitate the flow of damping fluid out of the chamber or the flow of damping fluid into the chamber.

Beyond this, it can be provided in an advantageous manner that the damping valve arrangement comprises an actuator arrangement which is mounted coaxial to the damping valve body with a housing and an axially displaceable actuator which is at least partially arranged in the housing. The actuator displaces axially in direction of the spring arrangement when acted upon by rising damping fluid pressure and preloads the spring arrangement. The spring force of the preloaded spring arrangement is transmitted to the valve disk via the force transmission disk which is constructed in accordance with the instant description.

BRIEF DESCRIPTION OF THE DRAWINGS

The invention will now be described in more detail referring to the drawings in which:

FIG. 5 is a top view of a further exemplary constructional embodiment of a force transmission disk according to the invention;

FIG. 6 is a sectional view of a force transmission disk according to FIG. 5; and FIG. 7 is a partial sectional view of a force transmission disk according to FIG. 5.

DETAILED DESCRIPTION OF THE PRESENTLY PREFERRED EMBODIMENTS

Figure 1:
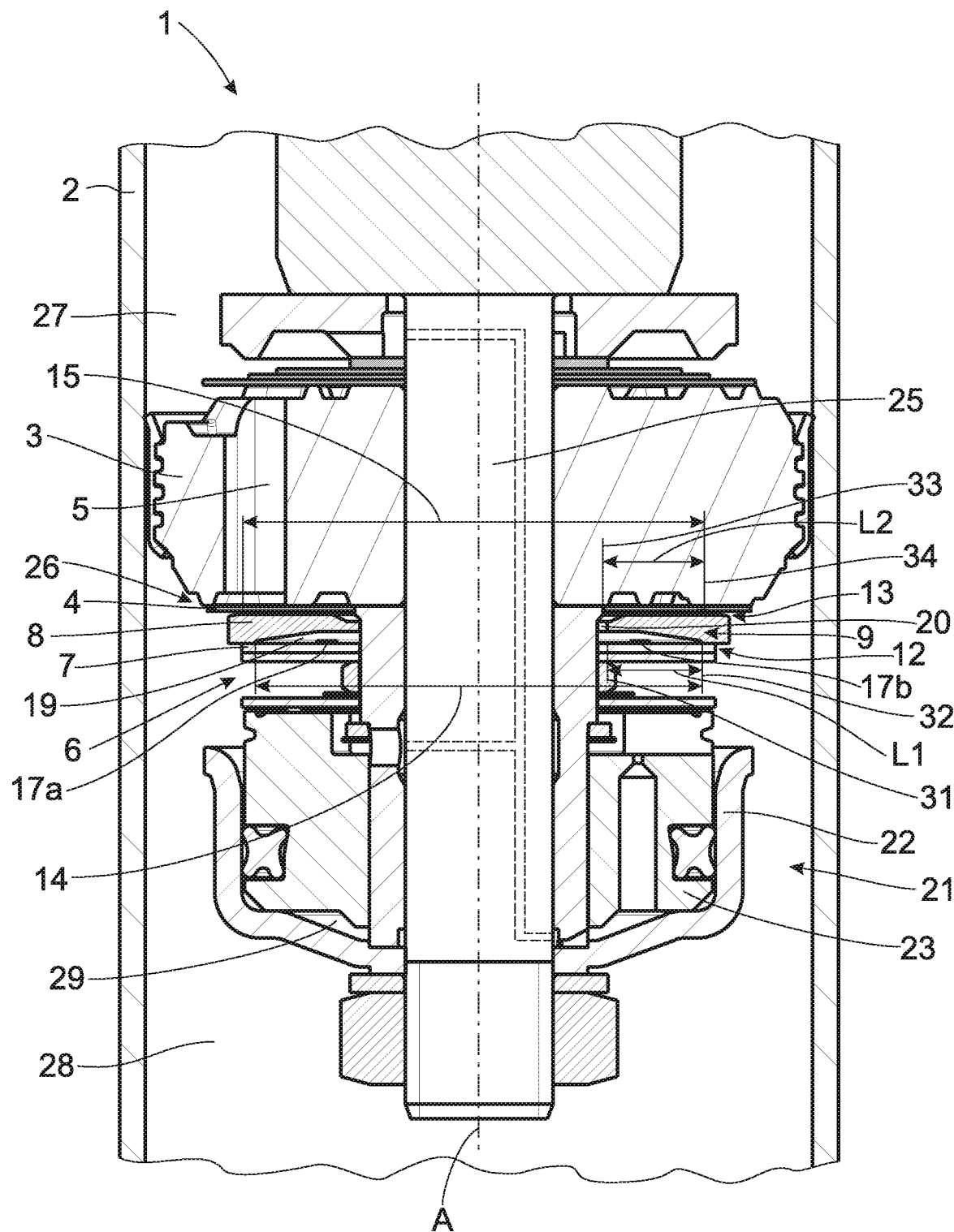
FIG. 1 is a sectional view of an exemplary constructional embodiment of a frequency-dependent damping valve arrangement, according to the invention, in a cylinder of a vibration damper.

FIG. 1 is a sectional view showing a portion of a vibration damper for a motor vehicle with a frequency-dependent damping valve arrangement 1 according to the invention.

The damping valve arrangement 1 is axially displaceably arranged inside of a cylinder 2 which is at least partially filled with a damping fluid, and the damping valve arrangement 1 is fastened to a support 25. The damping valve arrangement 1 comprises a damping valve body 3 with at least one check valve 26 having at least a first throughflow passage 5 for the damping fluid which is formed in the damping valve body 3 and which is covered by at least one valve disk 4.

Inside of the cylinder 2, the damping valve body 3 divides a first working chamber 27 from a second working chamber 28 such that the ratio of the damping valve pressure in the two working chambers 27, 28 varies depending on the direction of the axial movements of the damping valve body 3 in cylinder 2.

Beyond this, the damping valve arrangement 1 has an actuator arrangement 21 which is arranged coaxial to the damping valve body 3 and which contains a housing 22 and an axially displaceable actuator 23 which is arranged in the housing 22 and which axially limits a control space 29 which is enclosed in housing 22 and filled with the damping fluid, the direction of the axial displacement of actuator 23 being dependent on the damping fluid pressure in the control space 29.

A spring arrangement 6 is mounted between damping valve body 3 and actuator arrangement 21 and acts upon the valve disk 4 with a spring force axially in direction of the throughflow passage 5 and upon actuator 23 in the opposite direction.

The actuator 23 arranged inside of the actuator arrangement 21 is constructed to be axially displaceable such that it displaces in direction of valve disk 4 of check valve 26 when a damping fluid pressure persists over a longer period of time in the control space 29 of the actuator arrangement 21 and tensions the spring arrangement 6 via the force transmission disk 8. Accordingly, the spring force applied to the valve disk 4 by the spring arrangement 6 is increased via the force transmission disk 8 and the damping force of the check valve 26 is accordingly increased.

When the control space 29 empties, the preloading of the spring arrangement 6 and, therefore, also the level of spring force introduced into the valve disk 4 via the force transmission disk 8 decreases. Accordingly, the damping force of the check valve 26 is reduced in a defined manner.

All of the structural component parts of the damping valve arrangement 1 are arranged at a support 25 coaxial to one another with reference to the longitudinal axis A of the damping valve body 3. The support 25 extends through a mounting opening 30 formed in a center portion 9 of the force transmission disk 8. In this way, the force transmission disk 8 is centered and arranged on the support 25 so as to be freely axially sliding. The constructional embodiment depicted in FIG. 1 shows the damping valve body 3 in the form of a moveable piston mounted inside of the cylinder 2. However, the invention is in no way limited by the constructional embodiments shown in FIG. 1. It is also possible to construct the damping valve arrangement 1 with the force transmission disk 8 with an immoveable damping valve body 3 as is used, for example, as a bottom valve in two-tube dampers.

As is shown in all of the figures, the force transmission disk 8 has a first contact ring 12 and a second contact ring 13 which is formed at the opposite side of the force transmission disk 8. The first contact ring 12 is arranged at a first surface 10 of the force transmission disk 8, which first surface 10 faces the first spring element 7 in the installed state according to FIG. 1. The second contact ring 13 is mounted at the second surface 11 of the force transmission disk 8, which second surface 11 faces valve disk 4.

The first contact ring 12 has a first diameter 14 and is constructed so as to be axially elevated over the first surface 10 of force transmission disk 8. The second contact ring 13 with its second diameter 15 is constructed so as to be axially elevated over the second surface 11 of the force transmission disk 8.

When the spring arrangement 6 is acted upon by a force, the force transmission disk 8 receives the spring force introduced into the force transmission disk 8 by the first spring element 7 on an exactly defined first diameter 14 of the first contact ring 12 and conducts this spring force on an exactly defined second diameter 15 of the second contact ring 13 to the valve disk 4.

In this regard, the spring force introduced into the force transmission disk 8 is influenced by a first lever length L1 of the first spring element 7 between a radially inner edge area 31 of the first spring element 7 and the contact circle 32 of the first spring element 7 where it contacts the first contact ring 12 of the force transmission disk 8. The force passed on to valve disk 4 is influenced by the second lever length L2 of the valve disk 4 between a radially inner edge area 33 of valve disk 4 and the contact circle 34 of valve disk 4 where it contacts the second contact ring 13 of the force transmission disk 8.

The first lever length L1 of first spring element 7 is determined through the selection of the magnitude of the first diameter 14 of the first contact ring 12, and the second lever length L2 of the valve disk 4 is determined through the selection of the magnitude of the second diameter 15 of the second contact ring 13. Accordingly, the level of spring force introduced into valve disk 4, and therefore also the damping force characteristic, can be defined in a significantly more precise manner through the selection of the first diameter 14 and/or second diameter 15.

As is shown in each of FIGS. 1 to 7, the first contact ring 12 and second contact ring 13 are formed integral with the force transmission disk 8 or are formed out of the latter. The force transmission disk 8 can comprise a plastic with or without a fiber reinforcement or can comprise a metal. It can be produced by a cutting or noncutting production process or as a sintered component part.

The contact rings 12, 13 of the force transmission disks 8 shown in FIGS. 1 to 7 comprise a plurality of segments 16a, 16b, and radial recesses 17a, 17b are arranged between the segments 16a, 16b.

As will be appreciated from FIGS. 1, 3, 4, 6 and 7, the axial extension of the first contact ring 12 defines the axial height of a chamber 19 which is arranged between the first spring element 7 and the first surface 10 of the force transmission disk 8. This chamber 19 limits the maximum deflection height of the first spring element 7 under maximum loading of the spring arrangement 6. Chamber 19 can be dimensioned in such a way that the first spring element 7 cannot contact the force transmission disk 8 in the area of the center portion 9 thereof even at maximum deformation.

The constructional embodiments of a force transmission disk 8 which are shown in FIGS. 5, 6, and 7 can be formed from a sheet metal or as a shaped part from an organosheet. They are disk-shaped and have a plurality of openings 37 which are distributed at the radially outer edge area 36 thereof and which can also be formed as notches which may extend radially in direction of the center of the disk. The material between the openings 37 or notches is axially plastically deformed to form segmented contact rings 12, 13. FIG. 6 shows that the contact rings 12, 13 are formed out in such a way that the segments 16a extend axially proceeding from the second surface 11 and in such a way that segments 16b which proceed from the first surface 10 and extend axially in the opposite direction with respect to segments 16a are formed between segments 16a. Accordingly, every segment 16a, 16b projects axially from a surface 10, 11 of the force transmission disk 8 and simultaneously forms a recess 17a, 17b at the opposite surface 11, 10 of the force transmission disk 8. Beyond this, the force transmission disk 8 can comprise a circumferential connection edge portion 35 which connects the individual segments 16a, 16b of the segmented contact rings 12, 13 as is shown in FIGS. 5, 6 and 7.

Figure 2:
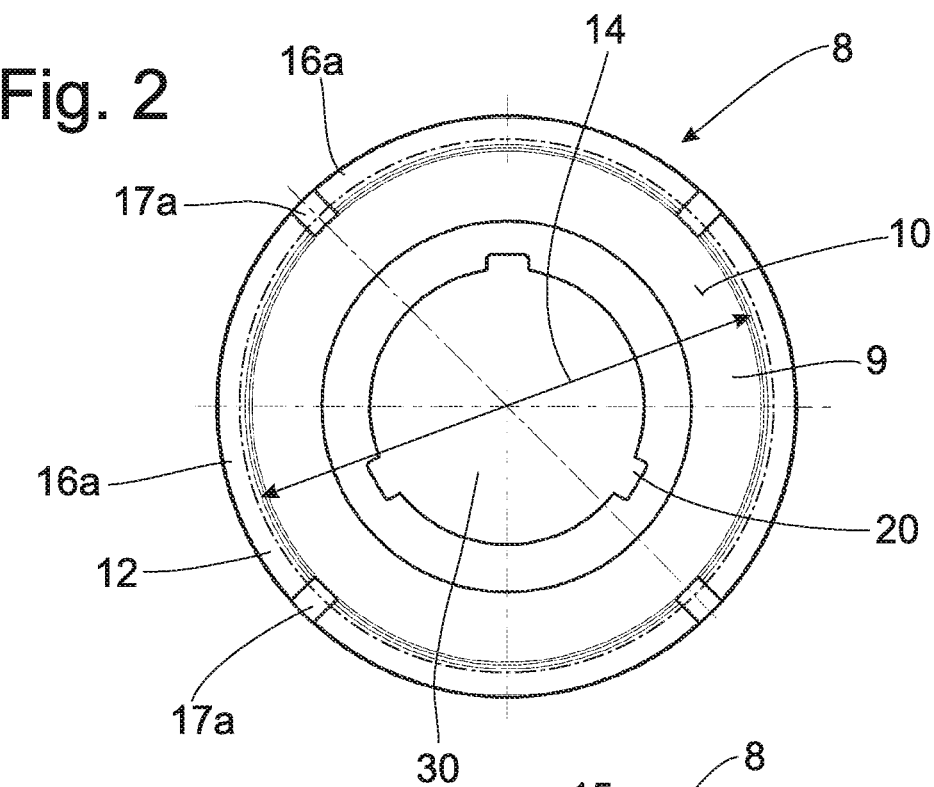
FIG. 2 is a top view of an exemplary constructional embodiment of a force transmission disk according to the invention.
Figure 3:
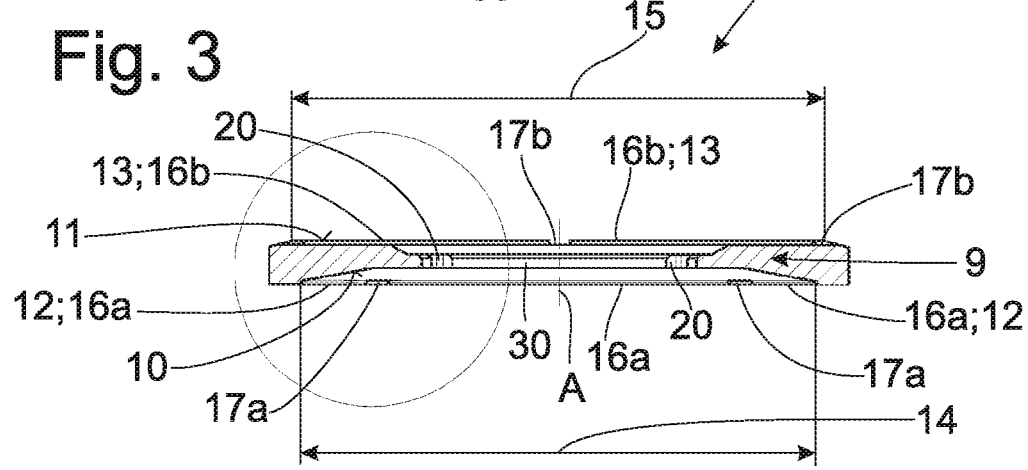
FIG. 3 is a sectional view of a force transmission disk according to FIG. 2.
Figure 4:
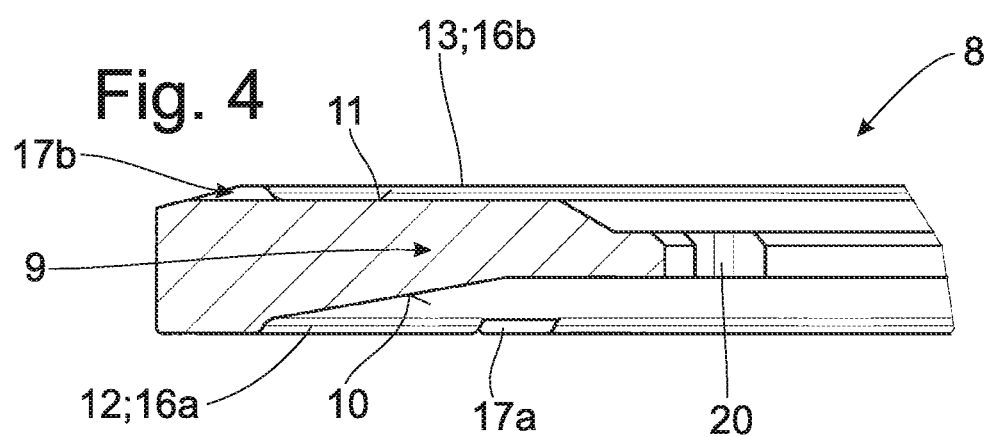
FIG. 4 is a partial sectional view of a force transmission disk according to FIG. 2.

FIGS. 2, 3 and 4 show a constructional embodiment of the force transmission disk having a plurality of throughflow channels 20 formed thereon. These throughflow channels 20 promote the flow of the damping fluid flowing out of chamber 19 or flowing into chamber 19 during the deformation of the first spring element 7 and a concomitant volume change of chamber 19.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A damping valve arrangement of a vibration damper for a motor vehicle, comprising:
a damping valve body arranged inside of a cylinder which is at least partially filled with a damping fluid; said damping valve body having a longitudinal axis (A) and a throughflow passage for the damping fluid; said throughflow passage covered by at least one valve disk, wherein said valve disk dampingly limits a flow of the damping fluid through said throughflow passage;
a spring arrangement axially displaceably arranged coaxial to said damping valve body comprising at least a first substantially disk-shaped spring element;
a force transmission disk arranged between said at least one valve disk and said first spring element so as to be axially displaceable coaxial to said damping valve body, said transmission disk receiving a spring force from said first spring element of said spring arrangement for transmitting said spring force to said valve disk;
said force transmission disk having a first surface facing said first spring element and comprising a first contact ring having a first diameter, said first contact ring being axially elevated above said first surface; and a second surface opposite said first surface facing said valve disk and comprising a second contact ring having a second diameter, said second contact ring being axially elevated above said second surface,
wherein said first contact ring and/or said second contact ring are constructed in a segmented manner and comprise at least two segments with at least two radial recesses formed between said segments.

2. The damping valve arrangement according to claim 1, wherein said first contact ring and/or said second contact ring are formed integral with said force transmission disk and/or are formed out of said force transmission disk.

3. The damping valve arrangement according to claim 1, wherein said force transmission disk is constructed from a plastic with or without fiber reinforcement.

4. The damping valve arrangement according to claim 1, wherein said force transmission disk is produced from a metal by a cutting or noncutting production process or as a sintered component part.

5. The damping valve arrangement according to claim 1, wherein said force transmission disk is constructed from a sheet metal or as a shaped part from an organosheet.

6. The damping valve arrangement according to claim 1, wherein an axial extension of said first contact ring axially defines a chamber arranged between said first spring element and said first surface of said force transmission disk.

7. A damping valve arrangement of a vibration damper for a motor vehicle, comprising:
a damping valve body arranged inside of a cylinder which is at least partially filled with a damping fluid; said damping valve body having a longitudinal axis (A) and a throughflow passage for the damping fluid; said throughflow passage covered by at least one valve disk, wherein said valve disk dampingly limits a flow of the damping fluid through said throughflow passage;
a spring arrangement axially displaceably arranged coaxial to said damping valve body comprising at least a first substantially disk-shaped spring element;
a force transmission disk arranged between said at least one valve disk and said first spring element so as to be axially displaceable coaxial to said damping valve body, said transmission disk receiving a spring force from said first spring element of said spring arrangement for transmitting said spring force to said valve disk;
said force transmission disk having a first surface facing said first spring element and comprising a first contact ring having a first diameter, said first contact ring being axially elevated above said first surface; and a second surface opposite said first surface facing said valve disk and comprising a second contact ring having a second diameter, said second contact ring being axially elevated above said second surface, wherein an axial extension of said first contact ring axially defines a chamber arranged between said first spring element and said first surface of said force transmission disk, wherein said force transmission disk comprises a center portion having at least one throughflow channel formed at said center portion for permitting damping fluid to flow out of said chamber or flow into said chamber.

8. A damping valve arrangement of a vibration damper for a motor vehicle, comprising:

a damping valve body arranged inside of a cylinder which is at least partially filled with a damping fluid; said damping valve body having a longitudinal axis (A) and a throughflow passage for the damping fluid; said throughflow passage covered by at least one valve disk, wherein said valve disk dampingly limits a flow of the damping fluid through said throughflow passage;

a spring arrangement axially displaceably arranged coaxial to said damping valve body comprising at least a first substantially disk-shaped spring element;

a force transmission disk arranged between said at least one valve disk and said first spring element so as to be axially displaceable coaxial to said damping valve body, said transmission disk receiving a spring force from said first spring element of said spring arrangement for transmitting said spring force to said valve disk;

said force transmission disk having a first surface facing said first spring element and comprising a first contact ring having a first diameter, said first contact ring being axially elevated above said first surface; and a second surface opposite said first surface facing said valve disk and comprising a second contact ring having a second diameter, said second contact ring being axially elevated above said second surface, wherein said damping valve arrangement additionally comprises an actuator arrangement mounted coaxial to the damping valve body with a housing and an axially displaceable actuator at least partially arranged in said housing; wherein said actuator displaces axially in direction of said spring arrangement when acted upon by a rising damping fluid pressure and preloads said spring arrangement; and wherein said spring force of said preloaded spring arrangement is transmitted to said valve disk via said force transmission disk.

* * * * *